(12) United States Patent
Zemlo

(10) Patent No.: US 6,393,380 B1
(45) Date of Patent: May 21, 2002

(54) INTERACTIVE SUPPORT SYSTEM MANUFACTURING EQUIPMENT

(75) Inventor: Brandon Zemlo, Franklin, WI (US)

(73) Assignee: Sierra Concepts Corporation, Santa Fe Springs, CA (US)

( * ) Notice: Subject to any disclaimer, the term of this patent is extended or adjusted under 35 U.S.C. 154(b) by 0 days.

(21) Appl. No.: 09/149,639

(22) Filed: Sep. 8, 1998

Related U.S. Application Data

(60) Provisional application No. 60/074,628, filed on Feb. 13, 1998.

(51) Int. Cl.[7] ............................................. G05B 19/418
(52) U.S. Cl. ....................... 702/188; 702/182; 702/184; 709/217; 710/18
(58) Field of Search .......................... 702/188, 34, 181, 702/184; 370/397, 497, 395.5, 395.64; 348/12, 6, 7; 709/224, 214, 217; 710/18; 706/20; 318/912, 806; 700/286

(56) References Cited

U.S. PATENT DOCUMENTS

| | | | | |
|---|---|---|---|---|
| 5,544,161 A | * | 8/1996 | Bigham et al. | ............. 370/397 |
| 5,638,427 A | * | 6/1997 | Flemming et al. | ............. 379/96 |
| 5,715,823 A | * | 2/1998 | Wood et al. | ........... 128/660.01 |
| 6,199,018 B1 | * | 3/2001 | Quist et al. | .................... 702/34 |

FOREIGN PATENT DOCUMENTS

WO     WO 99/41649     *   8/1999     ......... G05B/19/418

* cited by examiner

Primary Examiner—Kamini Shah
(74) Attorney, Agent, or Firm—George E. Haas; Quarles & Brady LLP

(57) ABSTRACT

Interactive access to a machine from a personal computer at a remote location is provided by connecting the machine and the computer to a communication network by modems which have digital data and analog audio input/output circuits. A point-to-point communication link is established between the machine and the remote location. Data and video are transmitted over the communication link using software that is configured to use a TCPIP network protocol. Voice transmission is handled by the audio circuits in the modems. The creation of a TCPIP network on the point-to-point communication link enables simultaneous access to the link by a plurality of programs and devices that separately handle the exchange of data, voice and video images over a shared communication medium.

22 Claims, 1 Drawing Sheet

INTERACTIVE SUPPORT SYSTEM MANUFACTURING EQUIPMENT

This application claims the benefit of U.S. Provisional Application No. 60/074,628 filed on Feb. 13, 1998.

FIELD OF THE INVENTION

The present invention relates to the trouble shooting, training and configuration of computer controlled machinery, such as machine tools in a factory, and more particularly to providing those support services from a remote location via a communication link.

BACKGROUND OF THE INVENTION

Machine tools, that once were purely mechanical devices controlled by a human operator, now are being controlled by computer systems which have been programmed to operate the machine tool in a prescribed manner to process a part being manufactured. As the complexity of the computer control grew, so did the ability to trouble shoot problems that arose with the operation of the computerized machine tool.

Presently trouble shooting requires that a service technician come to the premises at which the machine tool is located and interface with the machine's computer to execute diagnosis routines. In many instances, the technician must observe the operation of the machine tool to determine how it is performing in response to specific manually entered commands. In addition, the technician usually discusses the errors and historical performance with the operator of the machine. Once the source of the problem has been identified, the technician then enters commands into a terminal for the machine tool's computer which correct the situation. This process requires that a technician with a high level of skill in diagnosing and solving the problems come to the machine tool. Therefore, a large number of skilled technicians are required in order to timely service machine tools located throughout a large geographical area.

As a result, it is desirable to enable a technician to perform the trouble shooting and problem solving from a central location, such as the office of an equipment distributor or manufacturer, without having to go the location of the machine tool. This would enable a single technician to service machines throughout a large territory and service a greater number of machines as travel time is eliminated. Although it is feasible to remotely control the machine tool's computer, such a data communication link would not enable the service technician to observe the physical movement of the machine or to conduct real time discussions with the machine tool operator. As used herein the terms "remote control" and "remote location" relate to a physical separation of the machine tool and a control station at different locations, which precludes a person in one location from directly observing events at the other location or from speaking unaided to someone at the other location.

Although software presently exists for communicating either data, audio or video via a computer over a dial-up telephone line, the individual programs for each type of information have been considered incompatible for simultaneous execution so that all three types of information could be sent over the same telephone connection together in real-time. Each program typically requires exclusive control of the telephone line and thus can not share access with the other programs as each one expects to have the full bandwidth of the telephone line available to it. Thus the conventional approach would be to use separate telephone lines for each modality, which doubles or triples the communication expense, the number of lines and the connection effort.

An alternative proposal involves interconnecting the service technician's office with the machine tool computer by the Internet which would permit the transmission of audio and video along with the digital information. However, the rate of information transmission over the Internet between any given pair of computers varies greatly depending upon the amount of communication between other computers that is being carried at the same time. In addition, the Internet may send the packets of information via different paths. As a result, the Internet information transfer encounters unpredictable time delays which does not facilitate real-time control of the machine tool.

SUMMARY OF THE INVENTION

The present invention provides an interactive tool that facilitates remote support, such as diagnosis and virtual training, for the operation of machinery. This system utilizes a real-time, fully interactive graphical interface in conjunction with simultaneous transmission of at least audio or video, preferably both, to accomplish this inter-activity. The mechanism behind this technology is a TCPIP network that is established between a remote control computer and the host control for the machine. The conduit for this network is a point-to-point modem connection that is established using a single conventional communication link, such as a dial-up telephone line.

The present invention allows the limited bandwidth of a standard telephone line to simultaneously carry data for controlling the machine, voice communication between a remote technician and the machine operator, and video images of the people and the machine's operation. The simultaneous transmission of these three distinct types of information occurs in a time division multiplex manner.

DETAILED DESCRIPTION OF THE INVENTION

Figure 1:
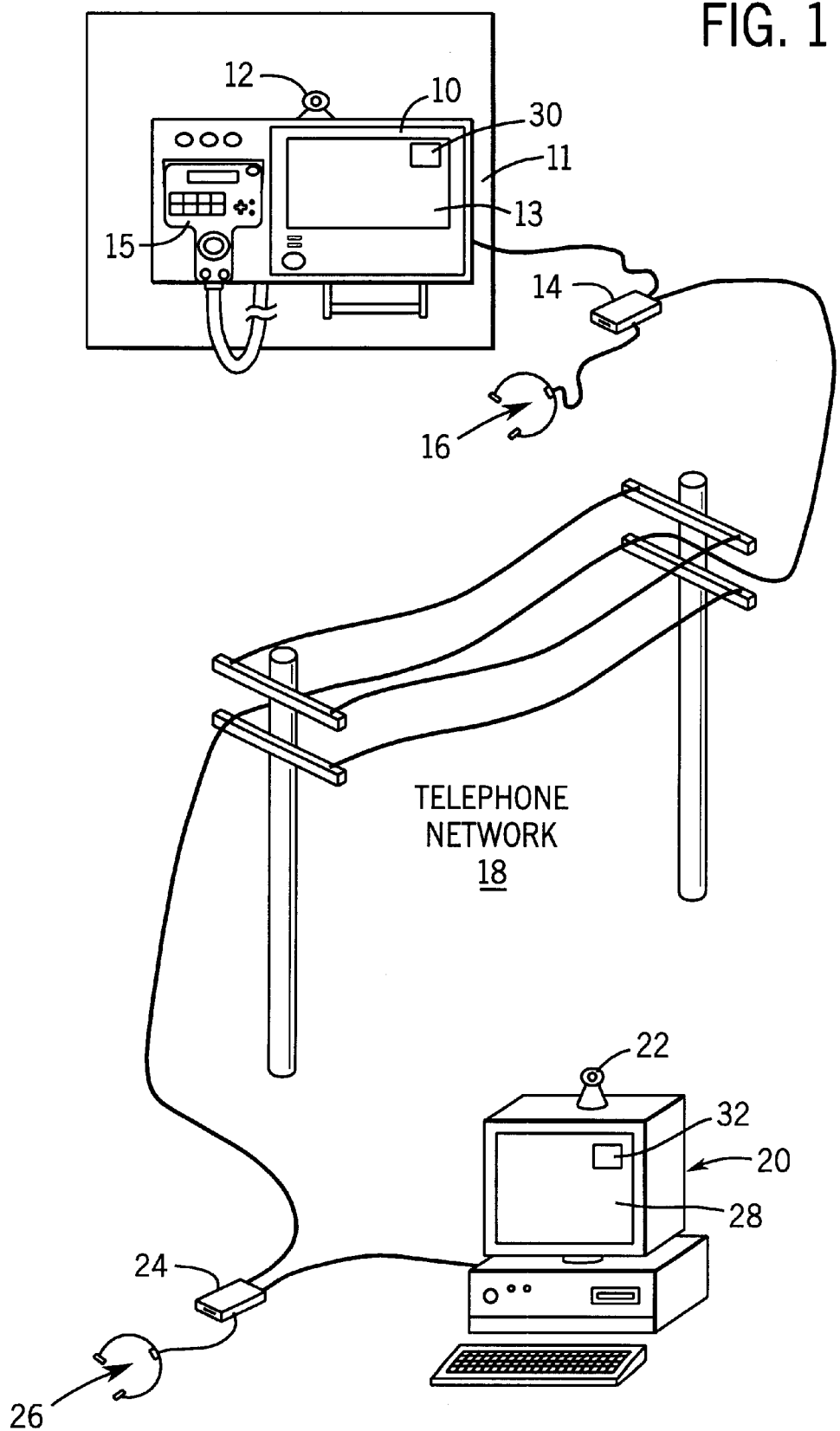
FIG. 1 schematically illustrates a remote interactive support system for providing service to a computer controlled machine tool.

With reference to FIG. 1, a machine tool 11 includes a personal computer (PC) based controller 10, such as a model 2100 Acramatic control system manufactured by Vickers, Inc., Electronic Systems, Lebanon, Ohio, U.S.A. This type of controller is a computer system which utilizes a Pentium microprocessor that executes either a Windows 95, Windows 98 or Windows NT operating system, licensed by Microsoft Corporation of Redmond, Wash., U.S.A. The controller 10 displays operational information to the machine operator on a video monitor 13. A conventional color video camera 12 for computers is connected to a parallel port on controller 10.

The controller 10 contains a serial port connected to a high speed, simultaneous voice-data modem 14, such as a DSVD modem, which may be an Accra model from Hayes Microcomputer Products, Inc. of Atlanta, Ga., U.S.A. In addition to providing an interface for the exchange of digital data between a computer and a communication link, this type of modem 14 also has analog audio connections for the ear piece and microphone of a headset 16. The DSVD modem 14 includes analog/digital circuitry that provides bidirectional conversion between analog signals for the headset and digitized audio signals sent over the communication link. A DSVD modem typically is used to enable persons at opposite ends of a telephone connection to play a video game and talk to one another at the same time. The modem 14 is connected to a standard dial-up telephone line which is part of telephone network 18.

Although the exemplary embodiment of the interactive support system in FIG. 1 has the machine tool controller 10 connected directly to the modem 14, one skilled in the art will appreciate that the present inventive concept can be implemented by separate personal computer interfacing the machine tool controller 10 to the modem 14 to handle communication over the telephone network. In this latter embodiment, the personal computer is considered to be part of the machine, even if it is used to perform other functions. The dial-up telephone network 18 connects the machine tool controller 10 to a remote site where a technician is located. This establishes a point-to point communication link between the two computer systems 10 and 20 which once established provides a continuous path that is dedicated to communication between those computer systems. This is in contrast to the Internet which is not a point-to-point communication link in that a given transmission is broken up into a plurality of data packets, which may be routed via different paths through the network along with packets from a vast number of other computers at any given time. Thus the Internet inherently has random delays of indeterminate length which affect transmission of information between the sender and receiver, which indeterminate delays are not present in point-to-point communication links.

A standard personal computer 20, executing either the Microsoft Windows 95, Windows 98 or Windows NT operating system, is located at the remote site, which may be the office of a distributor or manufacturer of the machine tool 11. This remote personal computer 20 has a parallel port to which a conventional video camera 22 is connected and a serial port connected to a simultaneous voice-data modem 24, similar to modem 14. Another headset 26 is connected to the modem 24 for use by the technician.

The hardware configuration shown in FIG. 1 supports a simultaneous bidirectional exchange of data, video and audio signals over the point-to-point communication link formed by the telephone network. Those skilled in the art will appreciate the transmission of these three modalities of data, video and audio is not truly simultaneous, but occurs in a high speed, time division multiplex mode in which each modality is broken into packets that are sent over the network interleaved in time. However, the interleaving occurs so rapidly that it appears to the user as though the three different types of information are being communicated at the same time.

To accomplish this exchange of information, controller 10 and remote personal computer 20 are each loaded with a commercially available data communication program, such as "PC Anywhere" licensed by Symantec Corp. of Cupertino, Calif., U.S.A. which allows a remote personal computer to access another computer system. The images produced by the video cameras 12 and 22 are sent to the associated modem 14 and 24 by a separate commercially available video communication program, such as Microsoft's "NetMeeting". Although "NetMeeting" is a conferencing program which also handles audio, that capability is not utilized in the preferred embodiment of the present system. These communication programs also handle receipt and display of data and video images from the telephone network 18.

The communication programs in both the machine tool controller 10 and personal computer 20 are configured to establish a Transport Control Protocol/Internet Protocol (TCPIP) network by employing an augmentation of a standard Remote Access Service (RAS) setup in the Microsoft Windows 9X/NT operating systems. Thus the software is configured as though it is to communicate over the Internet, instead of a standard dial-up telephone line, even though that latter medium is being used to provide an autonomous point-to-point communication link between the two computer systems. In effect, the communication system is configured as a "mini-Internet" with each computer system 10 and 20 being assigned a pseudo Internet address. Specifically, the communication software in the machine tool 11 acts as a server, while the existing software for controlling the machine tool acts as a server and a client. By creating a pseudo Internet server, neither the data communication program nor the video transmission program attempts to exert exclusive control over the associated modem 14 or 24 and both programs can operate simultaneously in exchanging data and video via that modem. In additional these programs can co-exist with the voice communication provided by the audio circuitry in the DSVD modems 14 and 24.

The TCPIP protocol also arbitrates among the programs when collisions occur as both programs attempt to send information over the telephone network at the same time.

In addition to configuring the data and video communication programs for the TCPIP protocol, each program and the voice channel of the DSVD modem in both computer systems 10 and 20 is set up to minimize the telephone line bandwidth which it requires for acceptable communication. This allows all three modalities, data, voice and video to share the same dial-up telephone connection. Specifically, the DSVD modem is configured for maximum audio compression and the delay is also set to the maximum value which still provides real-time audio. These settings optimize the modem's throughput of digital data (data and video information).

In the data communication program, the "color palette" is set to a small number (e.g. 16 colors) which reduces the amount of data being transmitted to replicate the display screen 13 of the machine tool operator panel. In addition the area of the desktop also is reduced to reduce the quantity of data being transferred. The video communication program may be one that is limited to processing only video from the camera, such as "Cu-Seeme" which is licensed by White Pines Software of Nashua, N.H., U.S.A. However the preferred program, Microsoft NetMeeting, is teleconferencing software which is intended to handle both video and audio. Teleconferencing software may offer greater flexibility in controlling the amount of video data being sent and the image quality. Nevertheless, sending the voice communication via the audio channel of the DSVD modems is more efficient than using the audio capability of the teleconferencing software, as the latter approach requires significantly greater bandwidth. Therefore, the video communication program is configured with the audio capability disabled. The video compression is set to the maximum value which will preserve color transmission and a realistic image refresh rate. It should be noted that the configuration of each communication program and the voice channel of the modem involve tradeoffs between acceptable quality of its information transfer and the effects on the remaining bandwidth that will be available to the transfer of the other types of information.

When a technician desires to access the machine tool 11 at a remote factory, that person signs on to the personal computer 20. The data communication program is executed to instruct the modem 24 to dial the telephone number of the modem 14 connected to the controller 10 for that machine tool. It also is possible with the TCPIP protocol to establish a three-way conference call via telephone network 18 so that persons at both the machine tool distributor and manufacturer can provide interactive support for a remotely located machine tool. When the communication link has been established between controller 10 and personal computer 20 via the dial-up telephone network 18, the data communication program being executed by the machine tool controller 10 transmits the digital machine operational data being displayed the controller monitor 13 to the technician's computer 20. The data communication program executing in the personal compuert 20 displays that data on monitor 28. Thus the remotely located technician sees a replica of the machine controller display.

Once the communication link has been established, the video communication software begins executing in the machine tool controller 10 and personal computer 20 to enable personnel at both ends of the link to observe one another on their respective monitors 13 and 28. The video communication software inserts a small video image 30 and 32 in the monitors 13 and 28, respectively. The machine tool operator also can aim the camera 12 so that the technician is able to observe the machine tool on the personal computer monitor 28. The size of the video display 32 can be changed by altering the parameters of the video communication program executing in the personal computer 20. The operator at the machine tool 11 wears headset 16 for voice communication with the remotely located technician, who is wearing headset 26.

The technician uses the keyboard of personal computer 20 to send commands to the machine tool controller 10 which replicate the commands that the operator can enter into the machine's input device 15. This enables the technician to view the present configuration of the machine tool, call up historical logs containing machine tool error information and instruct the machine tool to perform operations as though the commands were entered into the input device 15. The technician also may call for execution of diagnostic routines stored in the machine tool controller and have the data produced by those routines sent over the telephone network 18 for display on the personal computer monitor 28. In response to viewing the results of the diagnostic routines, the technician is able to send instructions either directly to the machine tool controller 10 or verbally to the operator, via headsets 16 and 26, to correct any operational errors.

The present system creates a TCPIP network between the machine tool 11, which acts as the host controller, and the technician's personal computer, which acts as a remote computer. This TCPIP network enables simultaneous access to the communication link 18 by the plurality of programs and devices that separately handle the exchange of data, voice and video over the common communication link. It should be understood that while a dial-up telephone network is utilized to describe the present invention, other types of point-to-point communication links are feasible.

This interactive support system permits remote trouble shooting to be performed with real time input/output machine state and logic level analysis. In addition, error log analysis and machine configuration determination of enabled options can be carried out. The present system also can be employed to transfer software updates from the distributor's or manufacturer's computer to each machine tool in the field. Such updating eliminates the need to duplicate and mail out computer diskettes containing the software. The system also provides the capability to update problematic machine tools on-demand.

In addition to trouble shooting machine tool operation, this remote interactive support system can be used to teach the operator about machine tool function using audio and video communication and actual interactive data transmission from the teacher at a remote location.

Although it is preferable that both audio and video be communicated for a full interactive exchange between the remote technician location and the machine tool, either audio or video alone can be combined with the data transmission for an enhanced interactive support.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

I claim:

1. A method for interactive access to a machine from a remote location, which method comprises the steps of:

providing a video camera which produces video images of at least one of the machine and an environment in which the machine is located;

establishing a point-to-point communication link between the machine and the remote location;

executing communication software at the machine and in a computer at the remote location to form a TCPIP network on the point-to-point communication link; and simultaneously exchanging data regarding operation of the machine and video images over the point-to-point communication link.

2. The method recited in claim 1 wherein exchanging data and exchanging video images utilize a TCPIP network protocol.

3. The method recited in claim 1 further comprising exchanging audio over the point-to-point communication link.

4. The method recited in claim 1 further comprising exchanging digitized audio over the point-to-point communication link.

5. The method recited in claim 1 further comprising:

connecting a first modem to the machine;

connecting a second modem to the computer at the remote location, each of the first and second modems has a digital data input/output circuit and an analog audio input/output circuit, wherein at each of the first modem and the second modem a signal in the digital data input/output circuit and a signal in the analog audio input/output circuit are merged for transmission over the point-to-point communication link; and employing the audio input/output circuits of the first and second modems to transmit audio over the point-to-point communication link.

6. The method as recited in claim 1 wherein executing communication software comprises executing a first program in each of the machine and the computer to exchange the data over the point-to-point communication link using a TCPIP protocol; and executing a second program in each of the machine and the computer to exchange the video images over the point-to-point communication link using a TCPIP protocol.

7. The method recited in claim 1 wherein the step of simultaneously exchanging comprises exchanging the data in a time division multiplex manner with exchanging the video images.

8. The method recited in claim 1 further comprising:

diagnosing operational problems of the machine in response to exchanging the data and the video images; and transmitting data to the machine from the remote location which reconfigures operation of the machine to rectify the operational problems.

9. A method for interactive access to a machine from a remote location, which method comprises the steps of:

establishing a point-to-point communication link between the machine and the remote location;

executing communication software, in the machine and in a computer at the remote location, to form a TCPIP network on the point-to-point communication link; and simultaneously exchanging data and audio over the point-to-point communication link, wherein the data pertains to operation of the machine and is exchanged utilizing a TCPIP network protocol.

10. The method recited in claim 9 further comprising:

connecting a first modem to the machine;

connecting a second modem to the computer at the remote location, wherein each of the first and second modems has a digital data input/output circuit and an analog audio input/output circuit; and the step of simultaneously exchanging data and audio comprises merging a signal from the digital data input/output circuit with a signal from the analog audio input/output circuit for transmission over the point-to-point communication link.

11. The method recited in claim 9 further comprising transmitting a video image over the point-to-point communication link.

12. The method recited in claim 9 further comprising:

providing a video camera which produces a video image of at least one of the machine and an environment in which the machine is located;

processing the video image by the machine with video communication software which is configured to transmit images over a TCPIP network;

transmitting the video image over the point-to-point communication link;

the computer receiving the video image from the point-to-point communication link; and displaying the video image at the computer.

13. The method recited in claim 10 wherein the step of simultaneously exchanging data and audio comprises transmitting digitized audio over the point-to-point communication link.

14. The method recited in claim 10 wherein simultaneously exchanging data and audio comprises exchanging the data in a time division multiplex manner with exchanging the audio.

15. The method recited in claim 9 further comprising diagnosing operational problems of the machine in response to simultaneously exchanging data and audio.

16. The method recited in claim 9 further comprising transmitting data over the point-to-point communication link to the machine from the remote location which reconfigures operation of the machine to rectify the operational problems.

17. The method recited in claim 9 further comprising training personnel at the machine by means of simultaneously exchanging data and audio.

18. A method for interactive access to a machine from a remote location, which method comprises the steps of:

providing a video camera which produces video images of the machine;

connecting the machine to a communication network by means of a first modem which includes a digital data input/output circuit and an analog audio input/output circuit;

connecting a computer at the remote location to the communication network by means of a second modem which includes a digital data input/output circuit and an analog audio input/output circuit;

establishing a point-to-point communication path between the first and second modems;

executing communication software, in the machine and in the computer, to form a TCPIP network on the point-to-point communication path for the exchanging digital data, video and audio; and simultaneously exchanging digital data related to operation of the machine, the video images, and audio over the TCPIP network.

19. The method recited in claim 18 wherein the digital data and the video are exchanged utilizing a TCPIP network protocol.

20. The method recited in claim 18 wherein executing communication software comprises executing a first program in each of the machine and the computer to exchange the data over the point-to-point communication path using a TCPIP protocol; and executing a second program in each of the machine and the computer to exchange the video images over the point-to-point communication path using a TCPIP protocol.

21. The method recited in claim 18 wherein simultaneously exchanging the digital data, the video images, and the audio occur in a time division multiplex manner.

22. The method recited in claim 18 further comprising:

diagnosing operational problems of the machine in response to simultaneously exchanging the digital data, the video images and the audio; and transmitting data to the machine from the remote location which reconfigures operation of the machine to rectify the operational problems.

* * * * *